United States Patent
Hua et al.

(10) Patent No.: US 10,515,013 B2
(45) Date of Patent: Dec. 24, 2019

(54) TECHNIQUES FOR HANDLING REQUESTS FOR DATA AT A CACHE

(71) Applicant: salesforce.com, inc., San Francisco, CA (US)

(72) Inventors: Jimmy Hua, San Francisco, CA (US);
Alejandro Soini, Berkeley, CA (US);
Christopher Wall, Austin, TX (US);
Matthew Small, Mill Valley, CA (US);
Raj Advani, Santa Ana, CA (US);
Shumin Zhao, Union City, CA (US);
Weiping Tan, Dublin, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 15/813,936

(22) Filed: Nov. 15, 2017

(65) Prior Publication Data
US 2019/0146920 A1    May 16, 2019

(51) Int. Cl.
*G06F 12/00* (2006.01)
*G06F 12/0815* (2016.01)
*G06F 12/0891* (2016.01)
*G06F 12/0811* (2016.01)
*G06F 12/1018* (2016.01)
*G06F 12/0804* (2016.01)
*G06F 12/0855* (2016.01)
(Continued)

(52) U.S. Cl.
CPC ............ *G06F 12/0815* (2013.01); *G06F 9/00* (2013.01); *G06F 12/0804* (2013.01); *G06F 12/0811* (2013.01); *G06F 12/0859* (2013.01); *G06F 12/0891* (2013.01); *G06F 12/1018* (2013.01); *G06F 16/24552* (2019.01)

(58) Field of Classification Search
CPC ............ G06F 12/0815; G06F 12/0891; G06F 12/0811; G06F 12/1018; G06F 12/0804; G06F 17/3048
See application file for complete search history.

(56) References Cited

U.S. PATENT DOCUMENTS

| | | | |
|---|---|---|---|
| 5,448,726 | A | 9/1995 | Cramsie et al. |
| 6,996,584 | B2 | 2/2006 | White et al. |

(Continued)

OTHER PUBLICATIONS

Office Action dated Aug. 9, 2017, in U.S. Appl. No. 14/922,733, 11 pages.

*Primary Examiner* — Mark A Giardino, Jr.
(74) *Attorney, Agent, or Firm* — Kowert, Hood, Munyon, Rankin & Goetzel, P.C.

(57) ABSTRACT

Techniques are disclosed relating to retrieving data from an in-memory cache, such as that for a database system. In various embodiments, an in-memory cache receives a request from an application for data, where the request specifies a class having a function executable to access the data from a location external to the cache in response to a cache miss. The cache handles the request such that the cache miss is not returned to the application. Specifically, the cache, in some embodiments, determines whether it stores the requested data, and in response to determining that it does not store the data, calls the function of the class to access the data from the location external to the cache and receives the data returned by the execution of the function. The cache then stores the received data in the cache and returns the received data in response to the request.

18 Claims, 7 Drawing Sheets

(51) Int. Cl.
  *G06F 9/00*    (2006.01)
  *G06F 13/00*   (2006.01)
  *G06F 13/28*   (2006.01)
  *G06F 16/2455* (2019.01)

(56) References Cited

U.S. PATENT DOCUMENTS

| | | |
|---|---|---|
| 7,237,235 B2 | 6/2007 | Maeda |
| 8,935,480 B1 | 1/2015 | Chien et al. |
| 9,152,732 B2 | 10/2015 | Zearing et al. |
| 9,286,293 B2 | 3/2016 | Jolly et al. |
| 2009/0187885 A1* | 7/2009 | Schneider ............... G06F 9/449 717/114 |
| 2013/0073809 A1* | 3/2013 | Antani .................. G06F 12/121 711/136 |
| 2017/0116125 A1* | 4/2017 | Sundaravaradan .......................... G06F 17/3048 |

* cited by examiner

TECHNIQUES FOR HANDLING REQUESTS FOR DATA AT A CACHE

BACKGROUND

Technical Field

This disclosure relates generally to database systems and, more specifically, to caching schemes implemented via database systems.

Description of the Related Art

Computer systems frequently include a primary memory such as a cache that enables quicker retrieval of data than retrieving from a secondary memory (e.g., a hard disk). A request to a cache for data may result in a cache hit in which the data is found in the cache or a cache miss in which the data is not found in the cache. Such a cache may be implemented in hardware, software, or any combination thereof. In some cases, a computer system may include multiple levels of cache in which smaller, faster caches are backed by larger, slower caches.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "node configured to execute an instance of a database management application" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. Thus the "configured to" construct is not used herein to refer to a software entity such as an application programming interface (API).

The term "configured to" is not intended to mean "configurable to." An unprogrammed FPGA, for example, would not be considered to be "configured to" perform some specific function, although it may be "configurable to" perform that function and may be "configured to" perform the function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, in a database system having eight nodes, the terms "first" and "second" nodes can be used to refer to any two of the eight nodes.

As used herein, the term "based on" is used to describe one or more factors that affect a determination. This term does not foreclose the possibility that additional factors may affect a determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is thus synonymous with the phrase "based at least in part on."

DETAILED DESCRIPTION

When a cache miss occurs, in various in-memory cache implementations, a NULL (or equivalent) value is typically returned to the requester. As used herein, the term "in-memory cache" is to be interpreted in accordance with its understood meaning in the art and refers to the use of a system's memory space as a cache that stores data. In various cases, this means that data is stored in Random Access Memory (RAM) using a caching scheme. As an example, Redis (an open-source software application) is an in-memory cache. When an in-memory cache returns a NULL value that is indicative of a cache miss, issues arise when an application is not designed to check the returned value before performing further operations on it. For example, a developer may assume that a given value was previously stored in an in-memory cache at an earlier point in the execution of their application. Accordingly, the developer may short-cut writing code in the application to check a returned value based on this assumption. As a result, an application may crash when it attempts to operate on a NULL value.

The present disclosure describes techniques for handling cache misses in a manner that overcomes some of the downsides of the prior approaches. In various embodiments described below, a database system having an in-memory cache calls a function to generate and/or retrieve requested data that is not found (i.e., misses) in the in-memory cache. The database system, in such embodiments, receives a request from an application for data stored in the in-memory cache, where the request specifies a class having the function that is callable to obtain the requested data. Accordingly, in some embodiments, the database system first checks the in-memory cache for the requested data and, in response to determining that the in-memory cache does not store the data, calls the function. In various embodiments, the database system stores the data that is returned by the function in the in-memory cache and returns the data to the requesting application. In embodiments in which the requested data is stored in the in-memory cache, the database system returns the requested data to application without calling the function of the class specified in the request. This handling approach may be advantageous over prior approaches as values returned to a requesting application do not need to be checked for NULL values because the database system may, in some cases, guarantee that a NULL value will not be returned to a requesting application, given that the database system generates or retrieves the requested value if it cannot be found in the in-memory cache.

Figure 1:
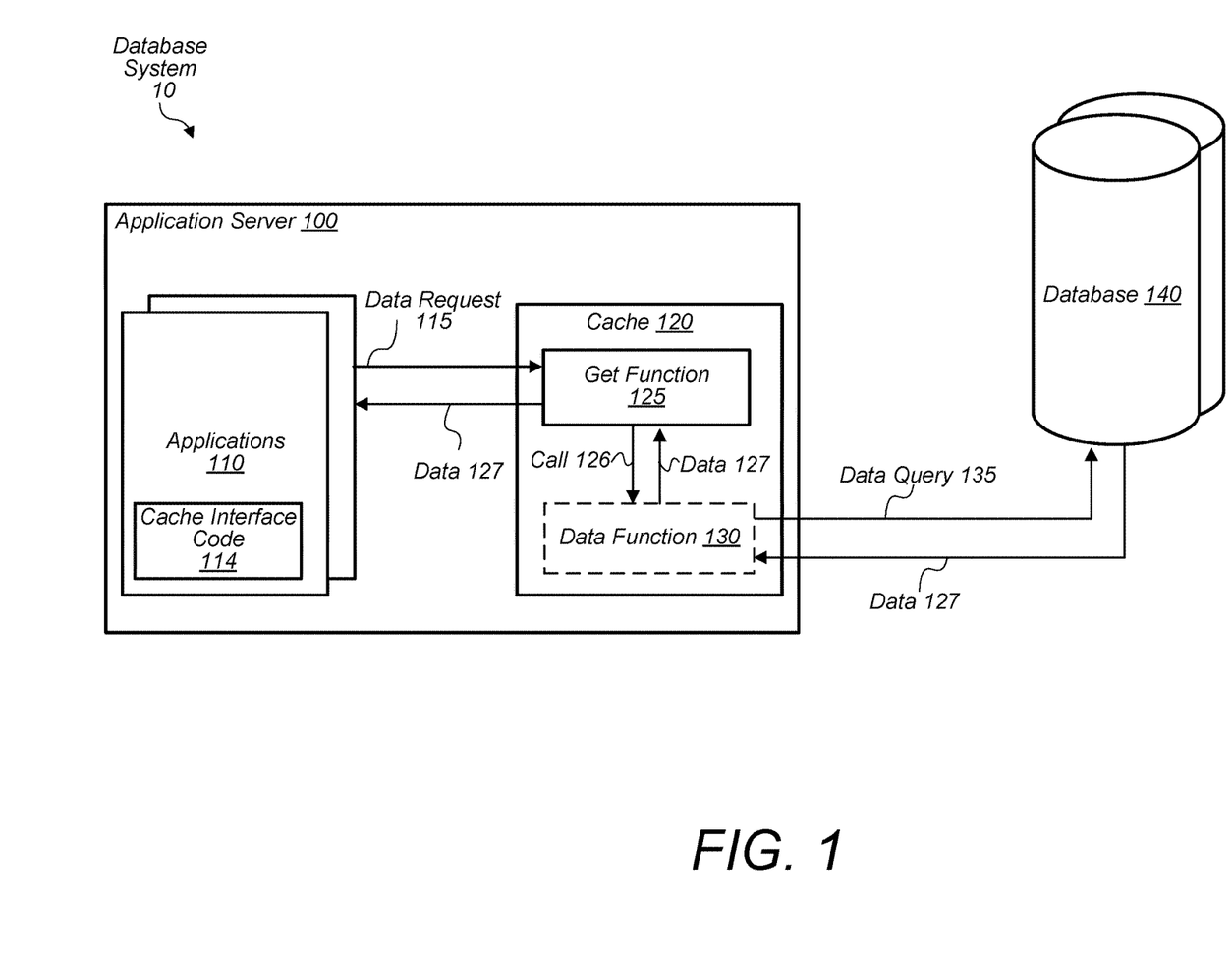
FIG. 1 is a block diagram illustrating exemplary elements of a database system that facilitates retrieving data from a cache, according to some embodiments.

Turning now to FIG. 1, a block diagram of a system 10 is shown. In the illustrated embodiment, system 10 includes an application server 100 and a database 140. As shown, application server 100 includes applications 110 having cache interface code 114 and a cache 120 having a get function 125 that is capable of calling a data function 130. In some embodiments, system 10 may include multiple servers 100 that are in communication with each other over a network and in some cases, share a common cache 120. In various embodiments, system 10 may be implemented differently than shown—e.g., cache 120 may implemented by a separate cache server instead of by an application server 100.

Application server 100, in various embodiments, is configured to execute software routines (such as applications 110) from various, different users as well as provide related data, code, forms, web pages, and other information to the users, database 140 (via database servers), and/or other external entities. In some embodiments, server 100 is configured to retrieve data 127 from database 140 (and other external databases) and store such data in local caches including cache 120. Server 100 may retrieve and store data in cache 120 on behalf of applications 110 executing on server 100.

Applications 110, in some embodiments, are a set of program instructions that are executable to implement various functions, tasks, etc. As an example, an application 110 may be a financial application that converts between various currencies. Applications 110 may be written in any suitable programming language such as C++, Java, Ruby, Python, Apex, etc. In various embodiments, applications 110 service requests from users (via user devices in communication with application server 100) for particular data 127 or to perform particular operations—e.g., convert from the U.S. dollar to the British Pound. Accordingly, in various embodiments, applications 110 communicate with cache 120 by sending a data request 115 to retrieve data 127 that is to be returned to a requesting user or to be operated on. In various embodiments, data request 115 is representative of a particular application 110 calling the get function 125 associated with cache 120.

Cache interface code 114, in various embodiments, includes software routines such as data function 130 for generating data 127 that may be stored in cache 120 and returned to a requesting application 110 in the event of a cache miss. In various embodiments, code 114 includes a class that inherits function 130 from an interface and further defines function 130. As an example, the class may be a User class that operates on user records. As such, the class may define function 130 to retrieve user records in the event that such records cannot be located within cache 120. Applications 110, in various embodiments, may include multiple variations of code 114 that each have a class that inherits from the same interface, but provides a different definition for function 130. In various embodiments, data request includes code 114 so that get function 125 may make a call 126 to the particular function 130 implemented in that code 114.

Cache 120, in various embodiments, includes a combination of software routines and hardware that implements an in-memory cache for storing data in a manner that may be more quickly and efficiently accessed than would otherwise be possible with database 140. In some embodiments, cache 120 is implemented entirely through hardware. In other embodiments, cache 120 is implemented through software executing on hardware. As noted above, cache 120 may be split across multiple servers 100. This may allow, for example, retrieved data to fit in a server 100's memory space (e.g., RAM), improving response times relative to storing such data in disk storage (e.g., disks of database 140). In various embodiments, cache 120 is implemented through a hierarchy having multiple software layers: a high-level layer that provides functionality (such as get function 125) for retrieving data 127 from cache 120; and a low-level layer that implements and handles the data structure that caches data. In one possible implementation, the low-level layer is software implementing a key-value store and the high-level layer is software that interacts with the key-value store and is built on top of the low-level layer. Redis may be an example of a low-level layer whereas get function 125 may be considered to be part of the high-level layer.

In some embodiments, get function 125 handles the storage and retrieval of data such that a cache miss (e.g., a NULL or equivalent value) is not returned to a requesting application 110. In processing a data request 115, get function 125 may first check whether the cache data store (implemented in the low level layer) is storing data 127. In cases in which data 127 is located in cache 120, it is returned to the requesting application 110. Otherwise, data 127 is generated and/or retrieved from a data source that is external to cache 120 such as database 140. In various embodiments, get function 125 makes call 126 to data function 130 to generate or retrieve data 127, which get function 125 then returns to requesting application 110. An example of cache 120 and get function 125 are described in more detail below with respect to FIG. 3.

Data function 130, in various embodiments, is a set of program instructions that are executable to retrieve or generate data that may be stored in cache 120 and, subsequently, returned to a requesting application 110. In some cases, data function 130 may be referred to as a miss function as it handles situations in which the requested data cannot be found in cache 120. In various embodiments, function 130 may obtain data 127 by issuing a data query 135 to database 140, issuing a request for data 127 from a third-party system, and/or performing a set of calculation to derive data 127. For example, consider an application 110 that requests a user record that cannot be found in cache 120. Data function 130 may include instructions for requesting the user record from database 140 via a data query 135. As another example, if an application 110 requests data 127 detailing the total sales over the past week and such data cannot be found in cache 120, then function 130 may include instructions for generating such data. As yet another example, if an application 110 requests a currency exchange rate that cannot be found in cache 120, then function 130 may include instructions for retrieving the exchange rate from a system external to system 10—e.g., a third-party system storing exchange rates. Data function 130 is described in more detail below with respect to FIG. 2.

Database 140, in various embodiments, is a shared storage and supporting software operable to store data to implement a database for users of system 10. Database 140 may be implemented by multiple storage devices that are connected together on a network (e.g., a storage attached network) and are configured to redundantly store data in order to prevent data loss. In some embodiments, database 140 stores data for a plurality of tenants (and their users) in a manner that prevents a particular tenant from accessing another tenant's data without permission. In various embodiments, database 140 includes one or more database servers that are configured to process requests for data from various entities of system 10, including applications 110 and cache 120. In some embodiments, database 140 provides data 127 to cache 120 in response to processing a data query 135 issued via data function 130 (which may be called by cache 120). (While not shown database 140 may provide data 127 directly to applications 110.)

Accordingly, as discussed throughout the present disclosure, an application 110 that needs particular data 127 may transmit a data request 115 to cache 120 through get function 125. Such a request 115 may include code 114 having a data function 130 that is callable to generate or retrieve the particular data 127. Thus, in the event that such data in not found within cache 120, get function 125 may call the data function 130 and may return the data 127 to application 110 while also storing the data 127 in cache 120. As such, the techniques described in the present disclosure thus handle data requests without returning a cache miss (e.g., a NULL value). This may be advantageous over prior approaches that do not attempt to prevent a NULL value from being returned, causing issues in a user's application 110.

Figure 2:
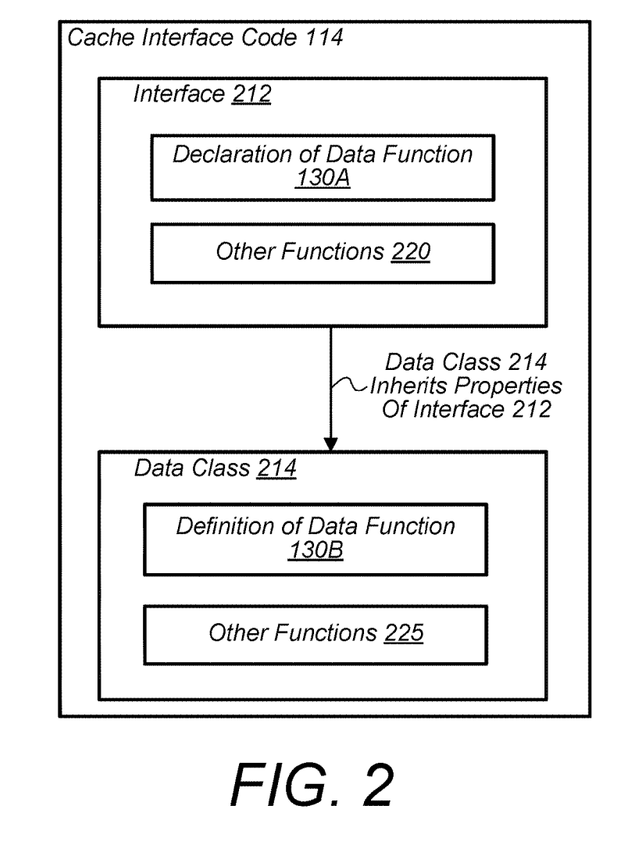
FIG. 2 is a block diagram illustrating exemplary elements of computer program code that facilitates generating and/or retrieving data, according to some embodiments.

Turning now to FIG. 2, a block diagram of one embodiment of cache interface code 114 is shown. As mentioned above, in various embodiments, code includes software routines (such as data function 130, which is shown as declaration of data function 130A and definition of data function 130B) that are executable to retrieve and/or generate data that has not been stored within cache 120. In the illustrated embodiment, code 114 include an interface 212 and a data class 214. As shown, interface 212 includes data function 130A and other functions 220, and data class 214 includes data function 130B and other functions 225. In some embodiments, various functions included in other functions 225 may be located in other classes or interfaces. In some embodiments, code 114 may be implemented differently than shown—e.g., code 114 may include other interfaces in addition to interface 212.

The terms "interface" and "class" are terms that are used in association with JAVA, for example. Accordingly, interface 212 may refer to a template construction that includes declarations of functions without their implementation. Such implementations may be left to the class that inherits interface 212. Class 214 may include a specific implementation of the functions declared within interface 212. As an easily understood example, interface 212 may be an "Animal" interface 212 that declares an eat function. Accordingly, classes 214 for different types of animals may provide different definitions for the eat function as the animals may eat different things. In various embodiments, interface 212 specifies functions for handling situations at cache 120 such as a cache miss. As such, in an example in which class 214 is defined for handling exchanges between currencies, class 214 may define the functions in interface 212 such that cache 120 handles a cache miss by generating or retrieving the requested exchange rate. By using interface 212, different classes 214 in in different applications 110 may provide different definitions that are specific to individual applications.

Figure 6:
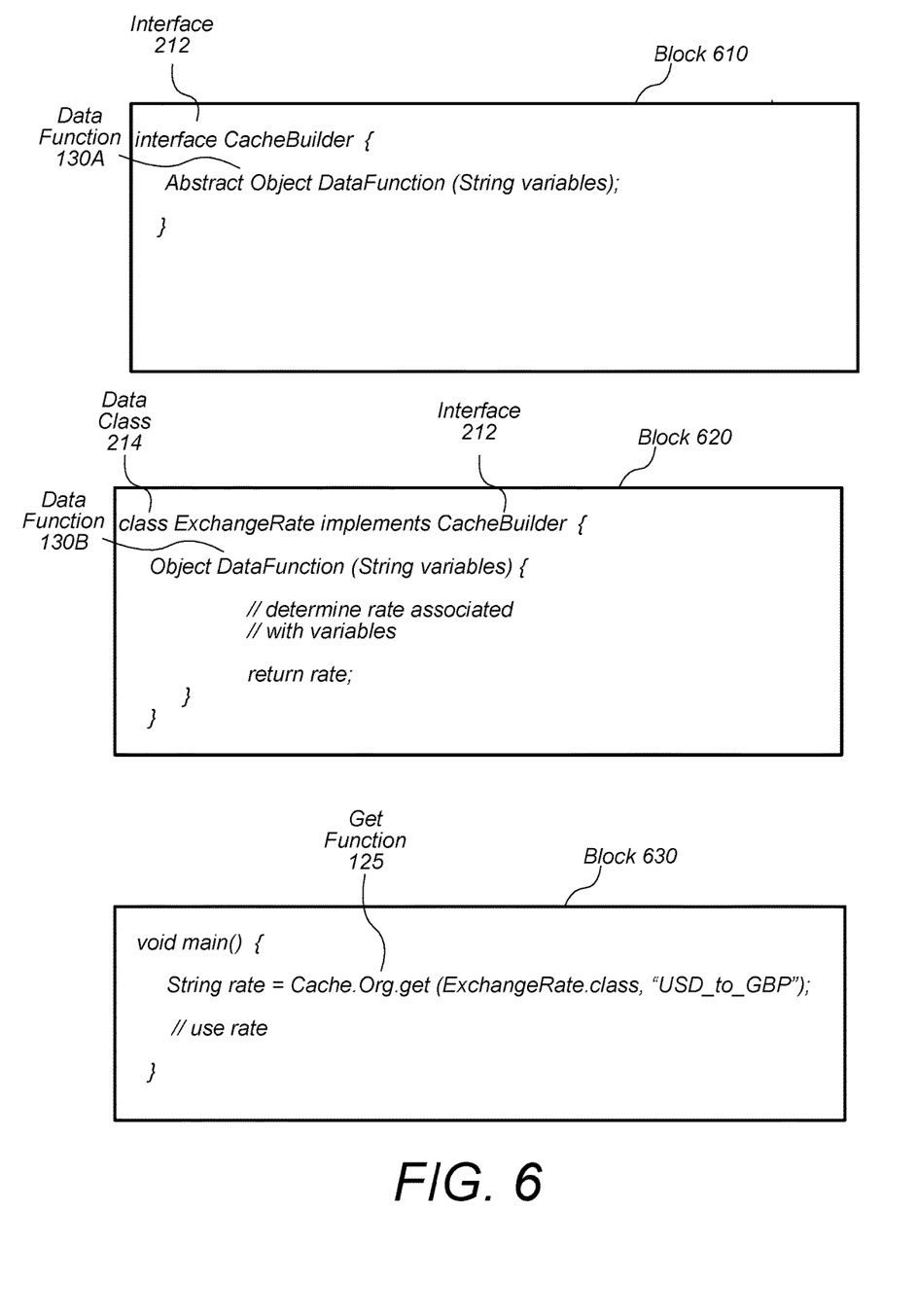
FIG. 6 is a block diagram illustrating exemplary computer program code that is executable to generate and/or retrieve data, according to some embodiments.

An example of interface 212 and data class 214 is provided and discussed in regards to FIG. 6. In particular, in various embodiments, interface 212 and data class 214 together provide a definition of function 130. In such embodiments, interface 212 declares, through function 130A, that function 130 exists and includes particular parameters. As an example, function 130A may state a function name such as cacheMiss and may state parameters such as a String parameters. Data class 214 may define, through function 130B, the functionality of function 130 (e.g., cacheMiss). For example, function 130B may include steps for retrieving the desired exchange rate from a third-party server in the event of a cache miss.

Interface 212, in various embodiments, is a software routine (e.g., a program-code template) that defines various member variables and functions such as functions 130A and 220. Unlike data class 214, in some embodiments, interface 212 is not instantiated during the execution of code 114—i.e. memory is not allocated for a programming object based on interface 212. Instead, in various embodiments, interface 212 declares functions 130A and 220 without providing a definition of their functionality, leaving such definitions to be provided in the class (e.g., class 214) implementing interface 212. That is, interface 212 may provide only signatures (i.e. the name and the parameters of a function) for functions 130A and 220. (Functions 130A and 220 may be referred to as abstract functions because they are declared, but are not implemented in interface 212.) Accordingly, function 130A may be considered a declaration of function 130 without a definition of its functionality.

Other functions 220, in various embodiments, include software routines that affect the storage and/or retrieval of data 127 from cache 120. Similar in nature to data function 130A, other functions 220 may provide declarations for various functions, the functionality of which is provided in other functions 225. (Other functions 225, however, may include functions that are not declared in functions 220.) In some embodiments, functions 220 include a staleness function that determines whether particular data 127 stored in cache 120 has become stale. For example, a currency exchange rate stored in cache 120 may be valid for only a short period of time as such a rate may be changing frequently. In various embodiments, users (e.g., customers) of system 10 provide definitions for other functions 220 (e.g., the staleness function). Accordingly, system 10 may call the staleness function before returning data 127 to a requesting application 110 in order to determine whether the data is stale (based on some specified threshold). If so, function 130 may be called to refresh such data. In this manner, functions 220 such as a staleness function may provide additional checks on a data request in addition to simply ensuring that non-NULL data is returned in response to a request. Alternately, a staleness function may be used to invalidate the data stored in the cache, and then to regenerate or retrieve updated data to satisfy request 115. For example, if an exchange rate has been stored for more than an hour, then it may be determined to be stale and should be refreshed. In various embodiments, staleness is determined based on changes to the particular data or the state of system 10. For example, instead of concluding that an exchange rate is stale because it has been stored for more than an hour, system 10 may determine whether the data has been updated at its source (e.g., the third-party system updated the exchange rate and thus the rate stored in cache 120 is deemed stale).

In some embodiments, functions 220 include an eviction function that controls which data 127 is evicted from cache 120. In various cases, some data 127 may be considered more valuable or useful than other data 127. Accordingly, when a particular tenant's allocation of space in cache 120 has become full, system 10 may call the eviction function to evict data 127 that the tenant has identified. This may be done when new data 127 is to be stored in cache 120, but cache 120 is full. As an example, the function may evict the exchange rate for USD to TJS so that it can be replaced with an exchange rate for USB to GBP.

Data class 214, in various embodiments, is a software routine (e.g., a program-code template such as a programming class) for creating programming objects that implement function 130B and, in some cases, functions 220. In various embodiments, class 214 implements interface 212 (among other interfaces) in order to store data 127 in cache 120. In implementing interface 212, in some embodiments, class 214 provides a definition for data function 130B and any functions 225 that correspond to other functions 220. Accordingly, function 130B may be considered to be the definition of function 130. (Interface 212 and data class 214 may be defined by different parties (e.g., users, tenants, etc.) For example, a customer of system 10 may define data class 214 (e.g., provide the functionality for functions 130 and other functions 220) while the provider of system 10 may define interface 212 (e.g., declare the functions for which the customer may define the functionality.)

In response to determining that a class 214 is implementing interface 212, in various embodiments, system 10 verifies that a definition has been provided for data function 130B before allowing that data class 214 to be instantiated. After a definition has been provided, in various embodiments, system 10 verifies that the definition is capable of returning data 127 in response to being executed. For example, a particular function 130B may be written so that it returns a user record and thus may be tested using a test user. Based on function 130B not returning valid data, in some embodiments, system 10 generates and provides an error log to the particular tenant associated with the particular function 130B. In various instances, system 10 may not be capable of testing function 130B as it may not know what variables should be passed in. Accordingly, system 10 may generate and provide an error log after executing the particular function 130B with variables provided by the particular tenant.

Figure 3:
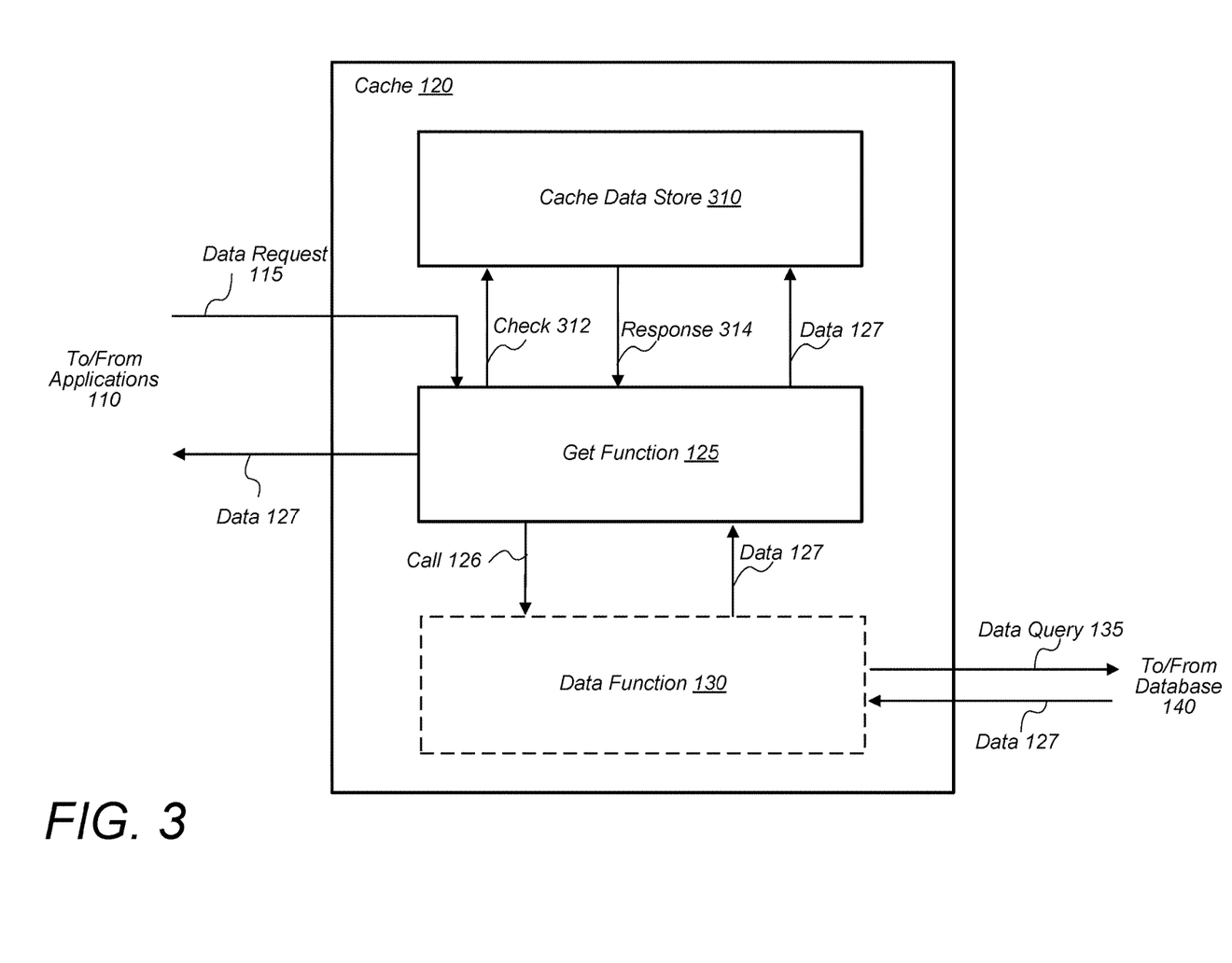
FIG. 3 is a block diagram illustrating exemplary elements of a cache that is capable handling requests for data, according to some embodiments.

Turning now to FIG. 3, a block diagram of one embodiment of a cache 120 is shown. As mentioned above, in some embodiments, cache 120 includes a combination of software routines and hardware that implement an in-memory cache for storing data 127 that may be more quickly accessed by application 110 than accessing such data via database 140. In the illustrated embodiment, cache 120 includes a cache data store 310 and a get function 125. While a single store 310 is shown, in various embodiments, cache 120 include multiple data stores 310 that are designated individually to one or more tenants using system 10. In various embodiments, cache 120 may be implemented differently than shown—e.g., get function 125 may be included in application 110 or another entity of system 10.

Cache data store 310, in various embodiments, stores data 127 for applications 110 running on server 100. In some embodiments, store 310 is implemented through software routines that address the underlying physical memory. In various embodiments, store 310 is a key-value store in which data is stored and retrieved using keys. For example, a row in a database table may be tied to a particular index value (i.e., a key) that is used to locate that row within system 10. Accordingly, the row may be stored in data store 310 using the particular index value (or a hash thereof) and later retrieved using that value. In various embodiments, however, the keys used to store data 127 are derived from the parameters that can be used to generate that data 127 (as will be described below).

Data 127 stored in store 310 may be bound to a particular session ID or tenant ID. Accordingly, when data 127 is bound by a session ID, then a user outside that session cannot have access to that data 127. For example, if a user is connected to system 10 via a laptop and a desktop, then these two connections may be treated as different sessions and thus data 127 stored for application 110 on behalf of the session tied to the laptop cannot be accessed by the user via the desktop. When data 127 is bound by a tenant ID, then the user connected to system 10 via the laptop and desktop may access data that is stored for both sessions from either system. That is, a tenant ID may be considered a different level of restriction that permits storage over different sessions and by different users. As such, whether data 127 is bound to a session ID or a tenant ID may be considered when fulfilling data request 115.

Get function 125, in various embodiments, is a callable software routine executable to retrieve data 127 from cache 120. In various embodiments, applications 110 provide data request 115 by calling get function 125 and passing in various parameters. These parameters may include a reference to a class object (or an instantiation of that class object) and various variables usable to generate or retrieve the requested data 127. When calling get function 125, in some embodiments, a requesting application 110 provides a reference to data class 214 and various variables that have the same data type (e.g., String, Map, etc.) as specified by the signature of function 130. That is, in various embodiments, get function 125 allows for cache 120 to know which particular function 130 should be called in order to process data request 115. (Multiple classes 214 may have been defined and thus may be storing data in cache 120.) For example, a requesting application 110 may provide, by calling function 125, a data request 115 that includes a currencyExchange class and two String variables "US" and "GP". Function 125 may then access the appropriate function 130 by calling it through the currencyExchange class and passing in the two variables.

After receiving a data request 115, get function 125 may determine whether store 310 is currently storing the requested data 127. In various embodiments, get function 125 generates a key usable to check store 310 for the data. The key, in some embodiments, is based on a combination of data class 214 and any variables passed in via get function 125. In various instances, get function 125 may hash the variables passed in and concatenate them with the name of class 214. This may allow for unique keys as such keys are tied to a specific class along with specific variables. Continuing with the above example, get function 125 may generate currencyExchange_U8XFDIJ2 as a key in which U8XFDIJ2 is a hash of "US" and "GP" (i.e., the variables).

In other instances, get function 125 may hash the variables passed in but not concatenate them with the name of class 214—e.g., generating a key of U8XFDIJ2. This may allow for shorter keys and thus less data being stored in cache 120 (although the possibility of such keys being unique may decrease). In some embodiments, get function 125 also appends a version number associated with data function 130 to keys used to store data 127 obtained via data function 130.

In embodiments in which a key is generated, get function 125 attempts to look-up data 127 in store 310 using the key (shown as check 312). In cases in which the requested data 127 cannot be found in store 310, get function 125 may perform a function call of data function 130 via the data class 214 that is passed in through get function 125. In various embodiments, data function 130 may be stored in cache 120 or database 140. In embodiments in which function 130 is not passed in via function 125, a reference to function 125 may be received instead. Accordingly, cache 120 may retrieve function 130 based on the reference (e.g., retrieve it from database 140). The result of calling function 130 (e.g., data 127) may be stored in store 310 using the key and then returned to the requesting application 110. In instances in which the requested data 127 is found in store 310, get function 125 may perform a function call of one or more of the other functions 225 via the class 214. In various embodiments in which the requested data 127 is found in store 310, get function 125 receives response 314, which includes the requested data 126. As mentioned above for example, get function 125 may call a particular other function 225 to determine whether data 127 stored in store 310 has become stale and if so, refresh data 127 by calling function 130. Get function 125 may then return the requested data 127 to the requesting application 110 if that data 127 is valid.

Data 127 that is stored by store 310 may be invalidated and evicted for various reasons. In response to data function 130 being modified, in various embodiments, get function 125 invalidates data stored for the previous version of function 130. That is, function 130 may be changed so that the manner of generating or retrieving data changes and thus data obtained under the previous version may be considered invalid. Get function 125 may determine data associated with a previous version of function 130 by looking at the versions appended to the keys used to store the data. As mentioned above, in some embodiments, get function 125 performs a function call of a particular other function 225 that evicts data 127 considered less important at the present time. Get function 125 may also perform a function call of another other function 225 that determines whether data 127 has become stale and thus should be invalidated or refreshed.

After receiving data function 130 from an application 110, in some embodiments, cache 120 stores data function 130 in conjunction with data 127 in store 310. Accordingly, the stored data function 130 may be used to perform cache warming in which data 127 is generated or retrieved during off cycles. That is, in various embodiments, database system 10 periodically calls function 130 to refresh the corresponding data 127 so that such data does not need to be generated or retrieved at the time an application 110 requests it. Cache 120 may set a flag for a stored data function 130 such that the data 127 tied to that function 130 is continually updated so that when it is requested, it does not need to be refreshed.

Figure 4:
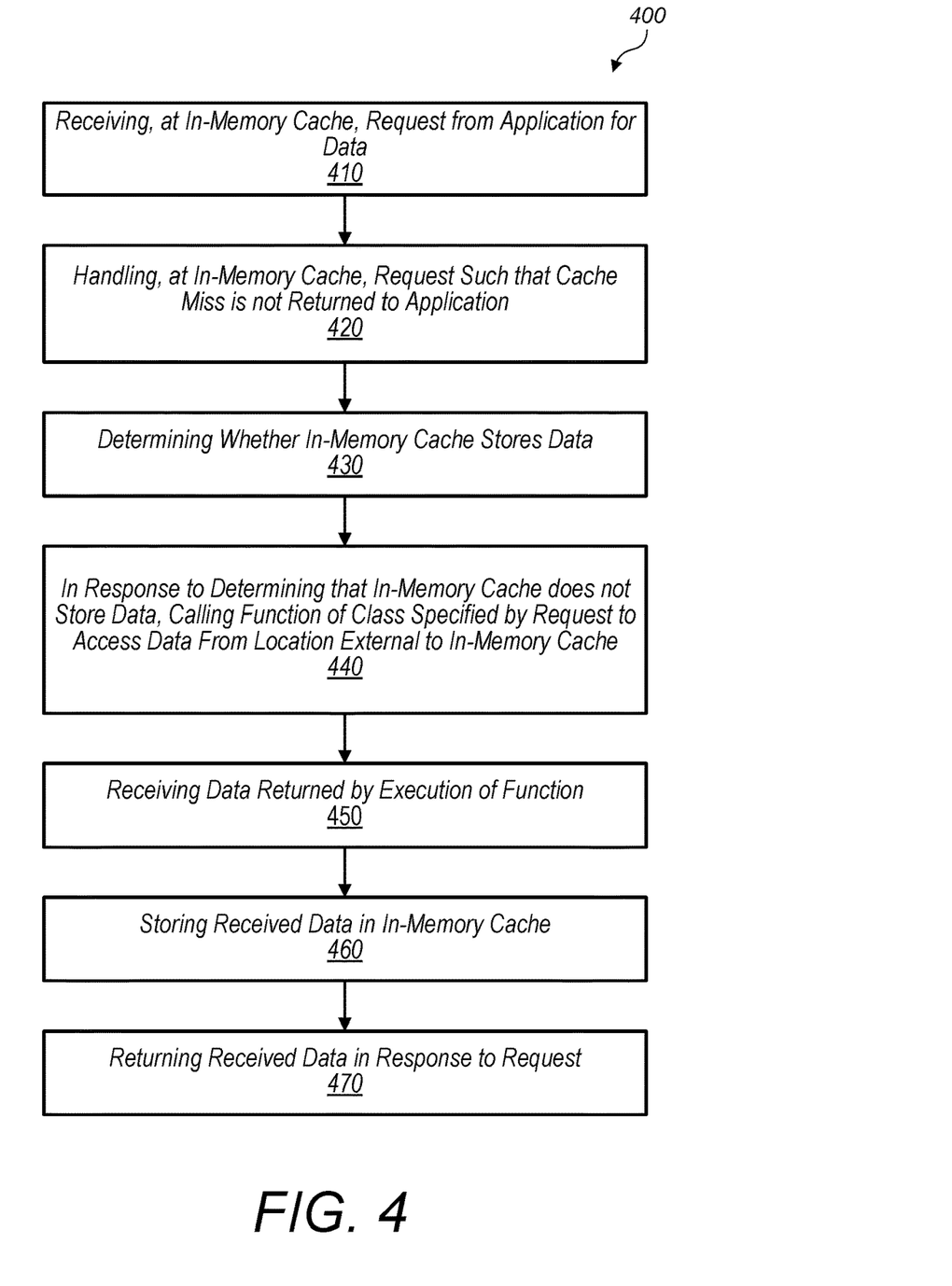
FIG. 4-5 are flow diagrams illustrating exemplary methods relating to handling, at a cache, requests for data, according to some embodiments.

Turning now to FIG. 4, a flow diagram of a method 400 is shown. Method 400 is one embodiment of a method performed by a computer system (e.g., system 10) at an in-memory cache (e.g., cache 120) to handle a request for data. In various embodiments, the request for data is handled such that a cache miss is not returned to the application (e.g., application 110) providing the request. In various embodiments, method 400 may include additional steps such as receiving an additional request for data and returning the data in response to the additional request without calling a function (e.g., function 130) specified in that request.

Method 400 begins in step 410 with a request (e.g., data request 115) for data being received at an in-memory cache from an application. In various embodiments, the request specifies a class (e.g., data class 214) having a function (e.g., function 130) executable to access the data (e.g., data 127) from a location that is external (e.g., database 140) to the in-memory in response to a cache miss. The function of the class may not be stored in the in-memory cache, and the external location may a database of the computer system. The computer system, in some embodiments, determines at some point whether the function is capable of returning data when called by the computer system. In response to determining that the function is not capable of returning the data, the computer system may generate a record (e.g., error log) having an indication (displayable to the user) that specifies that the function is not capable of returning data. In various embodiments, the request also includes variables usable to generate a query for accessing the data from a database at the external location. In step 420, the request is handled at the in-memory cache such that a cache miss is not returned to the application.

In step 430, the computer system determines whether the in-memory cache stores the data. In various embodiments, the computer system generates a key based on a value corresponding to the class specified by the request and a hash of the variables passed to the function. If the data is stored in the in-memory cache, then the key may be used to retrieve the data. In response to determining that the in-memory cache does not store the data, in step 440, the computer system calls the function of the class that is specified by the request to access the data from the location external. In step 450, the computer system receives the data returned by execution of the function. In step 460, the computer system stores the received data in the in-memory cache. For subsequent requests for the data, the computer system may call another function (e.g., a particular other function 225) of the class to determine whether the data has been stored for an interval of time that satisfies a threshold (e.g., greater than some length of time, equal to some length of time, etc.). In response to determining that the data has been stored for an interval of time that satisfies the threshold, the computer system invalidates the data or refreshes it by calling the function of the class specified in the request. In various embodiments, the computer system may invalidate the data in response to determining that the function has been modified in some manner. In step 470, the computer system returns the received data to the application.

Figure 5:
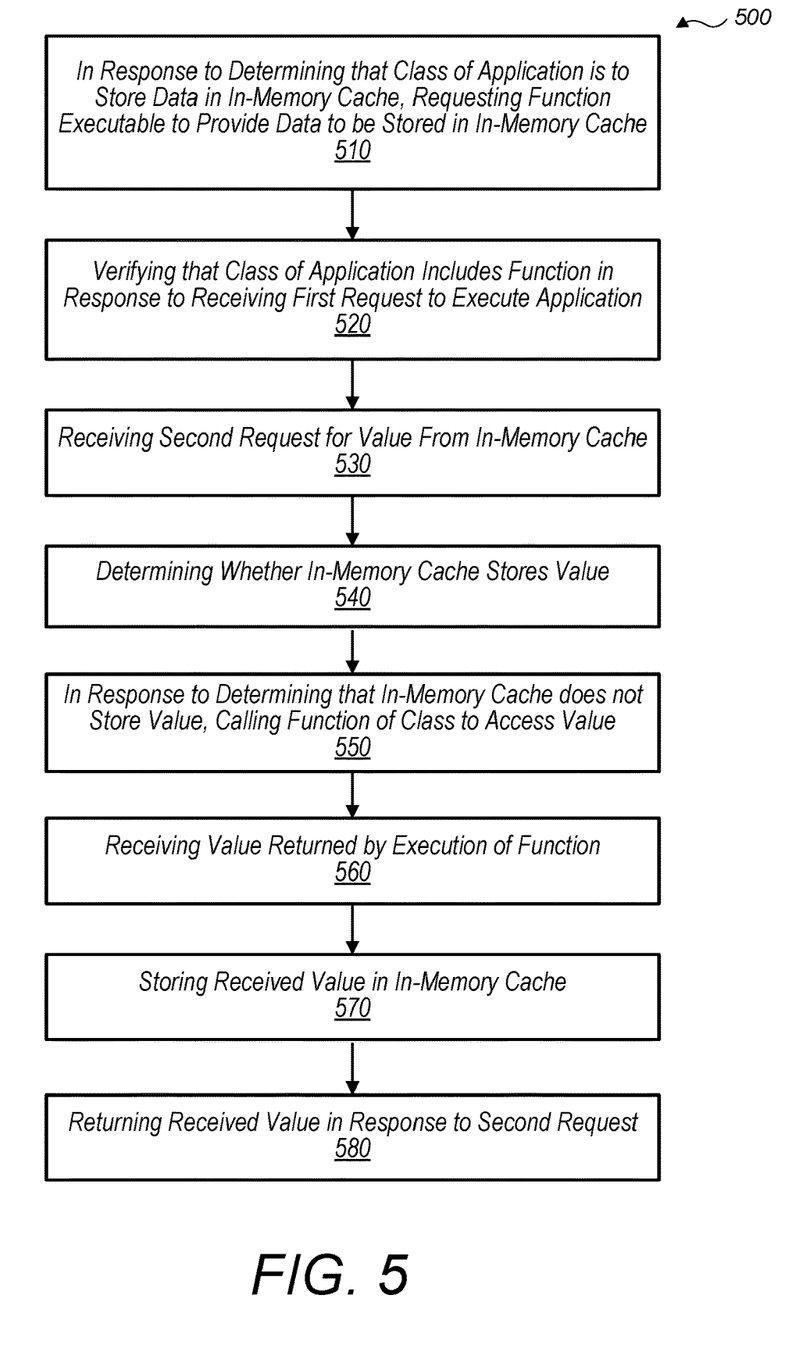

Turning now to FIG. 5, a flow diagram of a method 500 is shown. Method 500 is one embodiment of a method performed a computer system (e.g., server 100) to handle a request (e.g., data request 115) for data. In various embodiments, method 500 may include additional steps such as returning data in response to an additional request without calling a function specified in the additional request.

Method 500 begins in step 510 with a computer system requesting a function (e.g., function 130) executable to provide values (e.g., data 127) to be stored in an in-memory cache. The computer system may issue this request in response to determining that a class (e.g., data class 214) of an application (e.g., application 110) is to store data in the in-memory cache. The computer system, in various embodiments, determines that a class is to store data in the in-memory cache based on the class implementing an interface (e.g., interface 212) having a signature (e.g., function 130A) for the function. In step 520, the computer system verifies that the class of the application includes the function (e.g., function 130B) in response to receiving a first request to execute the application.

In step 530, the computer system receives a second request (e.g., data request 115) for a value from the in-memory cache. This second request may specify the class of the application. In step 540, the computer system determines whether the in-memory cache stores the value. In response to determining that the in-memory cache does not store the value, in step 550, the computer system calls the function of the class to access the value and in step 560, the computer system receives the value, which is returned by execution of the function.

In step 570, the computer system stores the received value in the in-memory cache. In some embodiments, the computer system generates a key used to store the value based on a hash of the variables included in the second request. The computer system may also append a version identifier to the key. In response to the class being associated with a different version, in various embodiments, the computer system invalidates the values that correspond to keys specifying other version. When storing the value, the computer system may call an additional function to determine a value in the in-memory cache that may be replace with the received value. The computer system may also call another function to determine values in the in-memory cache that have become stale and then may invalidate those values. In step 580, returns the received value to the application.

Turning now to FIG. 6, an exemplary diagram of a class 214 included in code 114 is shown. In the illustrated embodiment, a block 610 includes a particular interface 212 having a data function 130B, a block 620 includes a particular class 214 having a data function 130B, and a block 630 includes a get function 125. Although not shown, interface 212 may include additional functions (e.g., other functions 220), and class 214 may include definitions of the functionality (e.g., other functions 225) for those additional functions. In various embodiments, blocks 610, 620, and 630 may be different than shown—e.g., block 620 includes a class called Users instead of a class called ExchangeRate.

In an exemplary embodiment, a user of database system 10 wishes to store currency exchange rates in cache 120 as that user's application frequently converts between different currencies. Accordingly, in such an exemplary embodiment, the user defines a data class 214 called ExchangeRate that carries out such conversions. Additionally, in the exemplary embodiment, the user also specifies that ExchangeRate implements an interface 212 called CacheBuilder that allows data to be stored for ExchangeRate in cache 120. As shown, CacheBuilder includes a data function 130A called DataFunction, which is a declaration of a function that is to store data in cache 120. Accordingly, in the exemplary embodiment, the user defines a data function 130B (having the same function name and variables as data function 130A) that includes functionality for determining the exchange rate for a provided set of variables.

After providing a definition (i.e., function 130A) for function 130, in the exemplary embodiment, the user's application is executed and it makes a data request 115 to retrieve an exchange rate from the U.S. Dollar to the British Pound. In the exemplary embodiment, the user's application makes request 115 by calling get function 125 and passing in a class object for ExchangeRate and a String variable "USD_to_GBP." Using the class object that was passed in, cache 120, in the exemplary embodiment, performs function 130 by passing in the String variable to function 130 and carrying out the functionality defined in function 130B. In the exemplary embodiment, the exchange rate resulting from performing function 130 is stored in cache 120 and returned to the application.

Exemplary Computer System

Figure 7:
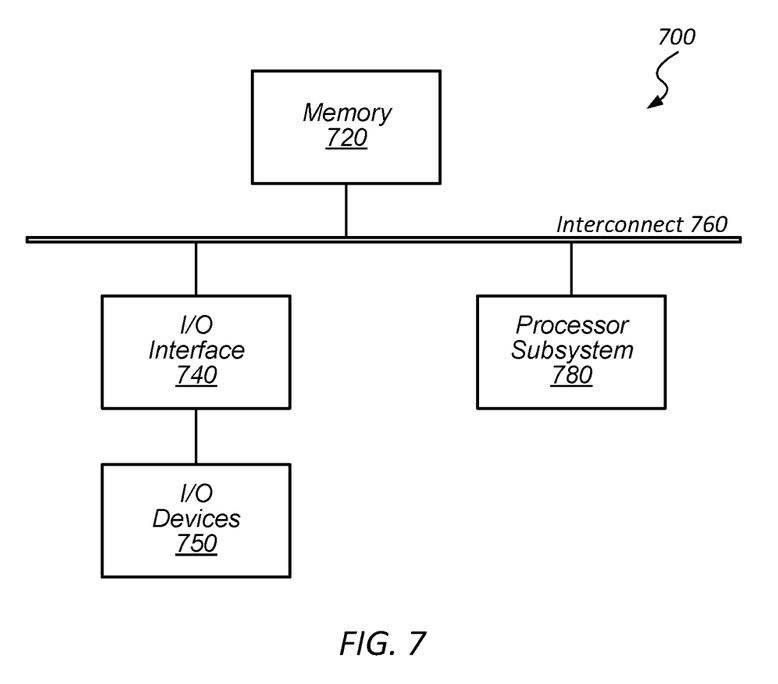
FIG. 7 is a block diagram illustrating an exemplary computer system, according to some embodiments.

Turning now to FIG. 7, a block diagram of an exemplary computer system 700, which may implement database system 10, is depicted. Computer system 700 includes a processor subsystem 780 that is coupled to a system memory 720 and I/O interfaces(s) 740 via an interconnect 760 (e.g., a system bus). I/O interface(s) 740 is coupled to one or more I/O devices 750. Computer system 700 may be any of various types of devices, including, but not limited to, a server system, personal computer system, desktop computer, laptop or notebook computer, mainframe computer system, tablet computer, handheld computer, workstation, network computer, a consumer device such as a mobile phone, music player, or personal data assistant (PDA). Although a single computer system 700 is shown in FIG. 7 for convenience, system 700 may also be implemented as two or more computer systems operating together.

Processor subsystem 780 may include one or more processors or processing units. In various embodiments of computer system 700, multiple instances of processor subsystem 780 may be coupled to interconnect 760. In various embodiments, processor subsystem 780 (or each processor unit within 780) may contain a cache or other form of on-board memory.

System memory 720 is usable store program instructions executable by processor subsystem 780 to cause system 700 perform various operations described herein. System memory 720 may be implemented using different physical memory media, such as hard disk storage, floppy disk storage, removable disk storage, flash memory, random access memory (RAM—SRAM, EDO RAM, SDRAM, DDR SDRAM, RAMBUS RAM, etc.), read only memory (PROM, EEPROM, etc.), and so on. Memory in computer system 700 is not limited to primary storage such as memory 720. Rather, computer system 700 may also include other forms of storage such as cache memory in processor subsystem 780 and secondary storage on I/O Devices 750 (e.g., a hard drive, storage array, etc.). In some embodiments, these other forms of storage may also store program instructions executable by processor subsystem 780. In some embodiments, application server 110 described above may include (or be included within) system memory 720.

I/O interfaces 740 may be any of various types of interfaces configured to couple to and communicate with other devices, according to various embodiments. In one embodiment, I/O interface 740 is a bridge chip (e.g., Southbridge) from a front-side to one or more back-side buses. I/O interfaces 740 may be coupled to one or more I/O devices 750 via one or more corresponding buses or other interfaces. Examples of I/O devices 750 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 700 is coupled to a network via a network interface device 750 (e.g., configured to communicate over WiFi, Bluetooth, Ethernet, etc.).

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
   receiving, at an in-memory cache of a computer system, a request from an application for particular data, wherein the request passes in a class having a function executable to access the particular data from a location external to the in-memory cache in response to a cache miss;
   handling, at the in-memory cache, the request such that the cache miss is not returned to the application, wherein the handling includes:
      determining whether the in-memory cache stores the particular data;
      in response to determining that the in-memory cache does not store the particular data:
         calling the function of the class passed in by the request to access the particular data from the location external to the in-memory cache;
         receiving the particular data returned by execution of the function;
         storing the particular data in the in-memory cache; and
         returning the particular data in response to the request; and
   invalidating, at the in-memory cache, data returned by execution of the function in response to determining that the function included in the class has been modified.

2. The method of claim 1, further comprising:
   calling another function of the class to determine whether data in the in-memory cache has been stored for an interval of time that satisfies a staleness threshold; and
   in response to determining that a portion of the data in the in-memory cache has been stored for an interval of time that satisfies the staleness threshold, invalidating the portion of the data.

3. The method of claim 1, wherein the particular data is stored in the in-memory cache based on a key, and the method further comprising:
   generating the key based on a value corresponding to the class passed in by the request and a hash of variables passed to the function.

4. The method of claim 1, further comprising:
   after storing the particular data in cache, receiving an additional request for the particular data, wherein the additional request passes in the class; and
   returning the particular data in response to receiving the additional request without calling the function of the class passed in by the additional request.

5. The method of claim 1, wherein the request includes variables usable to generate a query for accessing the particular data from a database at the external location, and wherein the particular data is stored in the in-memory cache in association with the variables.

6. The method of claim 1, wherein the function of the class is stored outside of the in-memory cache, and wherein the external location is a database of the computer system.

7. A non-transitory, computer-readable medium having program instructions stored thereon that are capable of causing a database system to perform operations comprising:
   receiving a request from an application for requested data stored in a cache of the database system, wherein the request passes in a class having a function that is executable to retrieve the requested data from a database;
   prior to handling the request, making a particular determination on whether the function is capable of returning data when called by the database system;
   determining, based on the particular determination, whether to generate a record having an indication specifying that the function is not capable of returning data, wherein the indication is displayable to a user associated with the application; and
   handling the request by:
      determining whether the requested data is stored in the cache;
      based on determining that the requested data is stored in the cache:
         returning the requested data in response to the request; and
      based on determining that the requested data is not stored in the cache:
         calling the function included in the class to retrieve the requested data from the database;
         storing the requested data in the cache; and
         returning the requested data in response to the request.

8. The computer-readable medium of claim 7, wherein the operations further comprise:
   in response to the function being modified such that a manner in which data is retrieved has changed, invalidating data in the cache that is associated with calling the function prior to the function having been modified.

9. The computer-readable medium of claim 7, wherein the operations further comprise:
   after determining that the requested data is stored in the cache, calling another function included in the class to determine whether the requested data has become stale; and
   in response to determining that the requested data has not become stale, returning the requested data in response to the request.

10. The computer-readable medium of claim 7, wherein the received request includes a set of values usable to retrieve the requested data from the database, and wherein the operations further comprise:
   deriving a key based on performing a hash of the set of values, wherein the requested data is stored in the cache in association with the derived key.

11. The computer-readable medium of claim 10, wherein data is stored in the cache based on a key-value pair scheme, wherein the determining whether the requested data is stored in the cache includes:

determining whether the requested data is stored in association with the derived key.

12. The computer-readable medium of claim 7, wherein the operations further comprise:

prior to receiving the request from the application and in response to determining that data is to be stored in association with the class, requesting that a definition be provided for the function.

13. A method, comprising:

in response to determining that a class of an application is to store data in an in-memory cache, a computer system requesting a function executable to provide values to be stored in the in-memory cache;

verifying, by the computer system, that the class of the application includes the function in response to receiving a first request to execute the application;

receiving, by the computer system, a second request for a value from the in-memory cache, wherein the second request specifies the class of the application;

determining, by the computer system, whether the in-memory cache stores the value;

in response to determining that the in-memory cache does not store the value:

calling, by the computer system, the function of the class to access the value;

receiving, by the computer system, the value returned by execution of the function;

storing, by the computer system, the value in the in-memory cache; and returning, by the computer system, the value in response to the second request.

14. The method of claim 13, wherein the second request specifies a set of variables usable to access the value, and the method further comprising:

generating, by the computer system, a key used to store the value in the in-memory cache based on a hash of the set of variables, wherein the key specifies a first version associated with the class.

15. The method of claim 14, further comprising:

in response to the class being updated to a second version, the computer system invalidating values in the in-memory cache that correspond to keys specifying the first version.

16. The method of claim 13, further comprising:

calling, by the computer system, an additional function to determine values in the in-memory cache that have become stale; and invalidating, by the computer system, the determined values.

17. The method of claim 13, further comprising:

calling, by the computer system, an additional function to determine a value in the in-memory cache to be replaced by the received value; and storing, by the computer system, the received value in place of the determined value in the in-memory cache.

18. The method of claim 13, wherein the determining that a class of an application is to store data in the in-memory cache is based on the class implementing an interface having a signature for the function.

\* \* \* \* \*